Nov. 15, 1966     C. T. KOOCHEMBERE     3,285,543
ROCKET PROPULSION SYSTEM FOR EJECTION SEATS
Filed Nov. 23, 1964     2 Sheets-Sheet 1
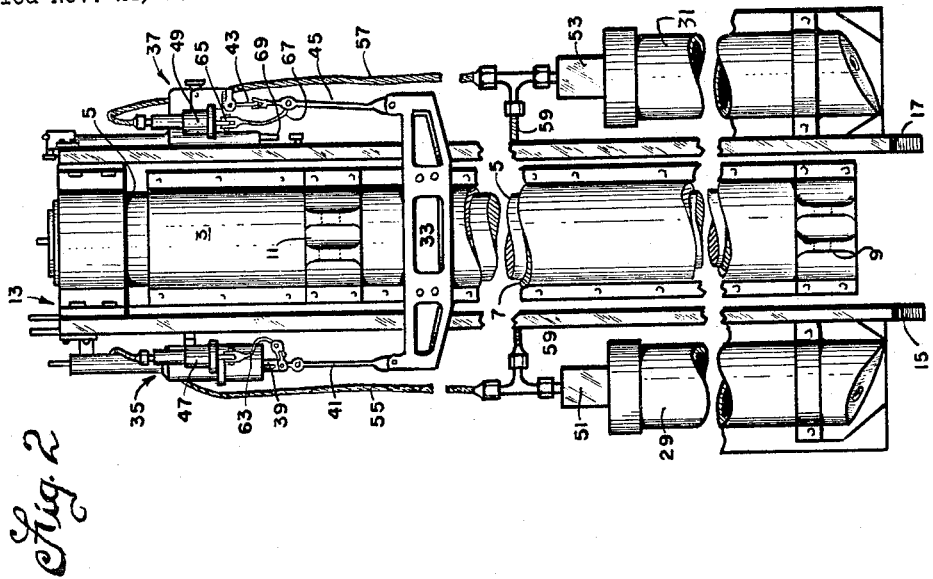
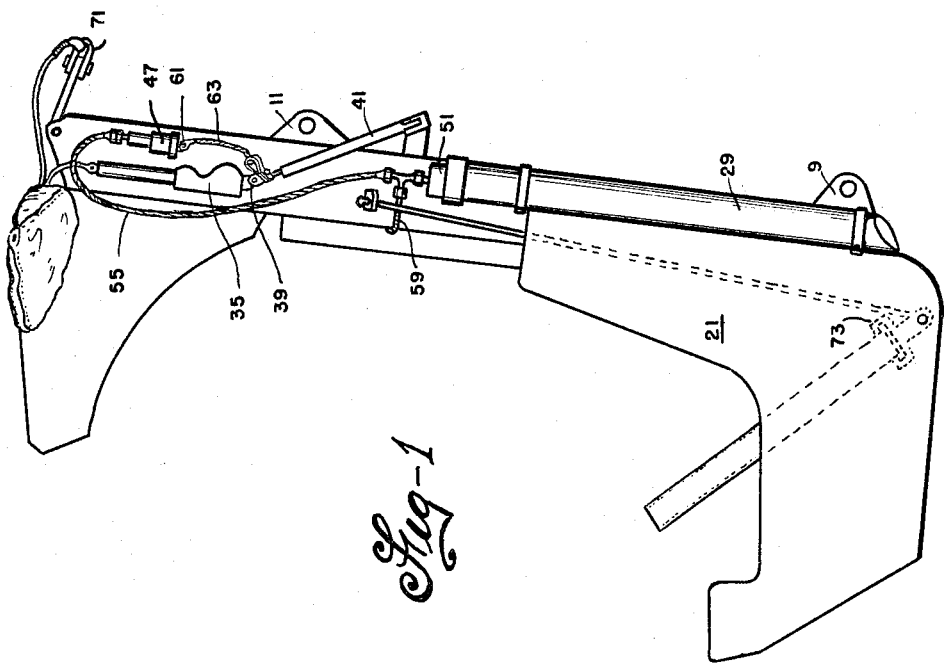
INVENTOR.
CHRIS T. KOOCHEMBERE
BY
ATTORNEY Nov. 15, 1966        C. T. KOOCHEMBERE         3,285,543
          ROCKET PROPULSION SYSTEM FOR EJECTION SEATS
Filed Nov. 23, 1964                         2 Sheets-Sheet 2
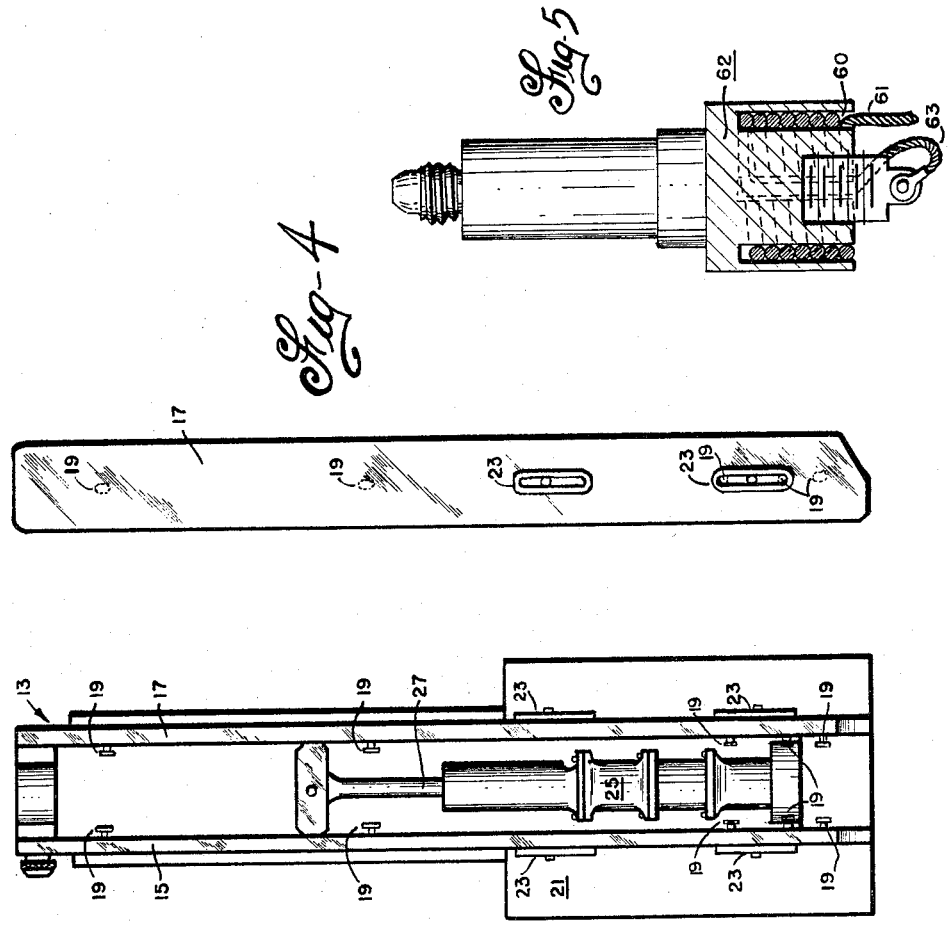
INVENTOR.
CHRIS T. KOOCHEMBERE
BY
ATTORNEY United States Patent Office 3,285,543
Patented Nov. 15, 1966

3,285,543
ROCKET PROPULSION SYSTEM FOR
EJECTION SEATS
Chris T. Koochembere, Glendora, N.J., assignor to the United States of America as represented by the Secretary of the Navy
Filed Nov. 23, 1964, Ser. No. 413,382
1 Claim. (Cl. 244—122)

The invention described herein may be manufactured and used by or for the Government of the United States of America for governmental purposes without the payment of any royalties thereon or therefor.

The present invention relates to apparatus for ejecting a pilot or other personnel from an aircraft and more particularly to an improved device having the capability of safely ejecting a pilot or occupant and his seat from an aircraft operating at any speed or altitude.

Various types of ejection devices have been employed in the past to project the pilot from his aircraft in emergency situations. One such device commonly used heretofore is a catapult which includes a pair of telescoping tubes and a ballastic charge that propels one of the tubes with the attached seat and pilot upwardly out of the aircraft when the charge is ignited. As the speed at which modern jet aircraft fly steadily increased and as it also became desirable to provide safe ejection capability even when the aircraft was at rest on the ground, greater upward thrusts became necessary. Maximum thrust of the catapult device, however, was limited by the length of the telescoping tubes that could be accommodated in available space in the aircraft and by the maximum acceleration forces that could be applied without physiological damage to the pilot. Accordingly, rockets which were built into the upwardly propelled tube of the catapult were used to sustain and augment the thrust initially developed by the catapult. In this way, adequate thrust was provided to project the pilot upwardly so as to clear the tail assembly or other projecting portions of the aircraft when the aircraft was operated at high speed and high enough to allow the main chute to open and safely arrest descent when the aircraft was at rest on the ground. Excessive tumbling of the seat and pilot after ejection from the aircraft, however, has often been experienced with this type of rocket augmented catapult ejection device.

It is, therefore a principal object of the present invention to provide novel and improved ejection apparatus with escape capability while the aircraft is at rest on the ground or at any altitude flying at any speed up to top speeds attained by modern jet aircraft.

It is a further object of the present invention to provide novel and improved aircraft ejection seat apparatus of a rocket augmented catapult type which is stabilized during ejection even when adjustments of the seat on the ejection seat assembly are made for the comfort and convenience of the pilot.

It is a further object of the present invention to provide novel and improved aircraft ejection seat apparatus of a rocket augmented captapult type wherein the center of gravity of the seat-pilot mass is not substantially changed when adjustments of the seat on the ejection seat assembly are made.

It is a further object of the present invention to provide novel and improved aircraft ejection seat apparatus of a rocket augmented catapult type which includes unique means for guaranteeing ignition of individual rocket motors mounted on the back of the seat at the proper instant to sustain the smooth upward thrust initiated by the catapult mechanism.

Other objects and many of the attendant advantages of this invention will be readily appreciated as the same becomes better understood by reference to the following detailed description when considered in connection with the accompanying drawings wherein:

FIG. 1 is a side elevational view of a preferred embodiment of the present invention;

FIG. 2 is an enlarged rear view of the embodiment shown in FIG. 1;

FIG. 3 is a rear view of the embodiment shown in FIG. 1 with the catapult mechanism and other parts removed to better show the manner in which the seat is adjustably mounted on its frame;

FIG. 4 is an outside elevational view of one of the guide rails of the seat frame shown in FIGS. 1–3; and FIG. 5 is an enlarged partially sectional view of either of the high pressure gas generators shown in FIG 2.

A preferred embodiment of the invention is illustrated in the drawing. As shown therein, the catapult mechanism 3 for the aircraft seat includes a pair of telescoping tubes 5 and 7. The outer tube 7 of the catapult mechanism 3 is secured to the aircraft in any suitable conventional manner preferably by means of the trunnions or the like 9 and 11. The upper extremity of the inner tube 5 of the catapult mechanism 3 is connected in any suitable manner to the seat frame 13 which includes the elongated parallel disposed guide rails 15 and 17. A plurality of guidance slippers 19 are affixed to the inner opposed surfaces of guide rails 15 and 17 and engage grooves in opposite sides of the outer tube 7 of the catapult mechanism 3. The pilot's seat 21 is slidably mounted on the seat frame 13 by means of inwardly extending lugs which are fixed to the seat 21 and engage the channeled members 23 affixed to the outer surfaces of guide rails 15 and 17. The electric motor 25, which is mounted on the seat frame 13 between opposed guide rails 15 and 17, drives the seat adjusting arm 27 and the attached seat 21 preferably through a suitable worm gear or the like not shown in the drawing.

The rocket motors 29 and 31 are mounted as shown on the back of the seat as shown on opposite sides of the frame 13. The nozzles of rocket motors 29 and 31 are positioned at the bottom thereof and are oriented in a manner which will be more apparent hereinafter such that their lines of thrust pass substantially through the center of gravity of the seat and pilot when he occupies the seat.

The T-bar 33 is secured as shown to the outer tube 7 of the catapult assembly. The drogue chute gun 35 and the pilot seat strap shackle release mechanism 37 are mounted on the seat 21 on opposite sides of the frame 13. The sear pin 39 of the drogue gun 35 is connected to one side of the T-bar 33 through a linkage mechanism that includes the lost motion rod 41. The sear pin 43 of the pilot seat strap shackle release mechanism 37 is connected to the other side of the T-bar 33 through a linkage mechanism that includes the lost motion rod 45.

The high pressure gas generators 47 and 49 are also mounted on the seat on opposite sides of the frame 13 and are respectively connected to the rocket motor ignitors 51 and 53 on the upper extremities of the rocket motors 29 and 31 through the flexible gas conduits 55 and 57. As will be more apparent hereinafter, the tubular conduit 59 which extends between the ignitors 51 and 53 provides an effective common gas input manifold for the ignitors. The sear pin 61 of the high pressure gas generator 47 is connected to the sear pin 39 of drogue gun 35 through cable 63 and the sear pin 65 of the high pressure gas generator 49 is connected to the sear pin 43 of the pilot seat strap shackle release mechanism 37 through cable 67. A predetermined length of each of the cables 63 and 67 is fed inwardly from the gas generator sear pin through the slot 60 formed in the core 62 that houses the firing mechanism of each generator and is then wound with a reverse twist about its core 62. In this way, as will be more apparent hereinafter, the cables 63 and 67 are readily dispensed without snarling or fouling when the inner and outer tubes of the catapult mechanism separate.

In operation, when the pilot desires to be ejected from the aircraft, he pulls a curtain (not shown in the drawing) down over his face. This automatically jetisons the cockpit canopy and energizes the catapult mechanism 3 in any suitable conventional manner. As the inner tube 5 of the catapult together with the frame 13, the seat 21 and the various accessories attached thereto then move upwardly, the guidance slippers 19 on the frame 13 ride in the grooves or track on opposite sides of the fixed outer tube 7 of the catapult and maintain proper longitudinal alignment of the telescoping tubes until full separation of the same occurs. When tubes 5 and 7 of the catapult have telescoped outwardly to a predetermined position, the lost motion rod or the like 41 which is secured at one end to the T-bar 33 is fully extended and sear pin 39 is withdrawn from the drogue gun firing mechanism 35. After a predetermined delay in time, the drogue gun fires and its slug deploys the drogue pilot and stabilizer chutes in a conventional manner.

At approximately the same instant that sear pin 39 is withdrawn from the drogue gun firing mechanism, the lost motion rod 45 which is secured to the other end of the T-bar 33 has also been extended as far as is possible and sear pin 43 is withdrawn from the pilot seat strap shackle release mechanism 37. After a predetermined delay in time, the plunger 69 of the release mechanism 37 is actuated and the shackle 71 which delays the opening of the main chute as well as the pilot's seat strap shackle 73 are opened also in a conventional manner.

Cables 63 and 67, which are also respectively connected to lost motion rods 41 and 45, withdraw sear pins 61 and 65 from the high pressure gas generators 47 and 49 as the tubes 5 and 7 of the catapult telescope outwardly beyond a predetermined point. Withdrawal of sear pins 61 and 65 then actuate firing pins within the gas generators 47 and 49. The firing pins of generators 47 and 49 then strike percussion caps that energize gas cartridges and supply gas at high pressure through the flexible conduits 55 and 57 to the rocket motor ignitors 51 and 53. The high pressure gas in conduits 55 and 57 then reacts against a piston type firing pin in the rocket motor ignitors 51 and 53. When the pressure applied against the firing pins in ignitors 51 and 53 exceeds a predetermined value, pins within ignitors 51 and 53 shear, the firing pins strike magnesium percussion caps in ignitors 51 and 53 and fuel in rocket motors 29 and 31 is ignited. It will be noted that due to the presence of the tubular conduit 59 that extends between the high pressure gas input terminals of ignitors 51 and 53, both rocket motors will always be ignited even if only one of the gas generators 47 and 49 is energized. It will also be noted that by adjusting the length of the cables 63 and 67 between lost motion rods 41 and 45 and the sear pins of gas generators 47 and 49, ignition of the rocket motors 51 and 53 may be timed to occur just as the tubes of the catapult mechanism 5 and 7 separate.

The position of the seat 21 on the frame 13 may be adjusted to accommodate the comfort and convenience of the pilot in the seat by controlling energization of the electric motor 25 in any suitable conventional manner. Inasmuch as the rocket motors 29 and 31 are mounted on the back of the seat itself, adjustment and readjustment of the seat 21 on the frame 13 does not affect or change the effective center of gravity of the seat and pilot and the preset lines of thrust of rocket motors 29 and 31 pass at all times substantially through said center of gravity.

Obviously, many modifications and variations of the present invention are possible in the light of the above teachings. It is, therefore, to be understood that within the scope of the appended claim, the invention may be practiced otherwise than as specifically described.

What is claimed is:

In an aircraft seat ejection system:
(a) a catapult mechanism which includes inner and outer telescoping tubes;
(b) means securing the outer tube of the catapult mechanism to the aircraft;
(c) a seat frame which is secured to the inner tube of the catapult mechanism;
(d) a pair of rocket motors mounted behind the seat on opposite sides of the seat frame, the nozzles of said rocket motors being oriented such that their lines of thrust extend substantially through the center of gravity of the seat and the pilot that occupies said seat;
(e) a seat slidably mounted on the seat frame;
(f) means for adjustably controlling the position of the seat on its frame;
(g) a drogue chute which is normally secured to the frame;
(h) a drogue gun which deploys the drogue chute from the seat;
(i) a linkage mechanism which is disposed between the outer tube of the catapult mechanism and the drogue gun and which actuates the drogue gun when the telescoping tubes are extended a predetermined amount;
(j) means including a normally closed shackle for securing the pilot in the seat;
(k) a mechanism for opening the shackle and allowing the seat and pilot to separate;
(l) a linkage mechanism which is disposed between the outer tube of the catapult mechanism and the shackle opening mechanism and which actuates the shackle opening mechanism when the telescoping tubes are extended a predetermined amount;
(m) a pair of rocket motors mounted on the seat;
(n) a gas operated rocket igniter for each rocket motor;
(o) a pair of gas generators secured to the seat, each said generator having a sear pin which, when withdrawn, initiates the generation of gas;
(p) means connecting the sear pin of one gas generator to the linkage mechanism that actuates the drogue chute;
(q) means connecting the sear pin of the other gas generator to the linkage mechanism that unshackles the pilot from the seat;
(r) and means connecting the gas generators to the gas operated rocket igniters.

References Cited by the Examiner

UNITED STATES PATENTS

| | | | |
|---|---|---|---|
| 3,020,011 | 2/1962 | Beam et al. | 244—122 |
| 3,126,177 | 3/1964 | Markowitz | 244—122 |
| 3,190,589 | 6/1965 | Mennborg | 244—122 |
| 3,191,892 | 6/1965 | Fuller et al. | 244—122 |
| 3,214,118 | 10/1965 | Martin | 244—122 |

MILTON BUCHLER, *Primary Examiner.*

B. BELKIN, *Assistant Examiner.*